United States Patent
Zhao et al.

(10) Patent No.: US 9,747,939 B2
(45) Date of Patent: Aug. 29, 2017

(54) DEVICES INCLUDING NEAR FIELD TRANSDUCER AND ADHESION LAYER

(71) Applicant: SEAGATE TECHNOLOGY LLC, Cupertino, CA (US)

(72) Inventors: Tong Zhao, Eden Prairie, MN (US); Meng Zhu, Bloomington, MN (US); Xiaoyue Huang, Eden Prairie, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/062,678

(22) Filed: Mar. 7, 2016

(65) Prior Publication Data
US 2016/0260448 A1    Sep. 8, 2016

Related U.S. Application Data (63) Continuation of application No. 14/396,486, filed as application No. PCT/US2013/038280 on Apr. 25, 2013, now Pat. No. 9,281,003.
(Continued)

(51) Int. Cl.
| | |
|---|---|
| *G11B 5/48* | (2006.01) |
| *G11B 13/08* | (2006.01) |
| *G11B 7/1387* | (2012.01) |
| *G11B 5/31* | (2006.01) |
| *G11B 5/60* | (2006.01) |

(Continued)

(52) U.S. Cl.
CPC .............. *G11B 13/08* (2013.01); *G11B 5/314* (2013.01); *G11B 5/3133* (2013.01); *G11B 5/4866* (2013.01); *G11B 5/6088* (2013.01); *G11B 5/702* (2013.01); *G11B 7/1387* (2013.01); *G11B 2005/0021* (2013.01)

(58) Field of Classification Search
CPC ....... G11B 13/08; G11B 5/314; G11B 5/4866; G11B 5/6088; G11B 5/702; G11B 7/1387; G11B 2005/0021; G11B 5/3133; G11B 5/3163; G11B 5/1272
USPC ............................... 369/13.33, 13.13, 112.27
See application file for complete search history.

(56) References Cited

U.S. PATENT DOCUMENTS

| 6,144,098 A | 11/2000 | Iyer |
| 7,773,330 B2 | 8/2010 | Itagi |
(Continued)

FOREIGN PATENT DOCUMENTS

| EP | 0580368 | 1/1994 |
| JP | 2011-008899 | 1/2011 |
(Continued)

OTHER PUBLICATIONS

PCT International Search Report and Written Opinion for International Application No. PCT/US2013/038280 dated Aug. 13, 2012 (10 pages).
(Continued)

*Primary Examiner* — Ali Neyzari
(74) *Attorney, Agent, or Firm* — Mueting, Raasch & Gebhardt, P.A.

(57) ABSTRACT

A device including a near field transducer (NFT); a write pole; at least one dielectric material positioned between the NFT and the write pole; and an adhesion layer positioned between the NFT and the at least one dielectric material.

20 Claims, 7 Drawing Sheets

Related U.S. Application Data (60) Provisional application No. 61/637,985, filed on Apr. 25, 2012.

(51) Int. Cl.
*G11B 5/702* (2006.01)
*G11B 5/00* (2006.01)

(56) References Cited

U.S. PATENT DOCUMENTS

| | | | |
|---|---|---|---|
| 8,040,761 B2 | 10/2011 | Kawamori | |
| 8,149,657 B2* | 4/2012 | Huang | G02B 6/102 360/125.4 |
| 8,248,897 B2 | 8/2012 | Shimazawa | |
| 8,339,740 B2* | 12/2012 | Zou | G11B 5/314 360/125.31 |
| 8,343,364 B1 | 1/2013 | Gao | |
| 8,351,151 B2* | 1/2013 | Katine | G11B 5/314 360/110 |
| 8,385,158 B1 | 2/2013 | Hu | |
| 8,400,902 B2 | 3/2013 | Huang | |
| 8,427,925 B2* | 4/2013 | Zhao | B82Y 10/00 360/59 |
| 8,599,656 B2 | 12/2013 | Jin | |
| 8,773,956 B1 | 7/2014 | Wang | |
| 8,787,129 B1 | 7/2014 | Jin | |
| 8,790,527 B1 | 7/2014 | Luo | |
| 8,804,468 B2* | 8/2014 | Zhao | G11B 5/3133 369/13.33 |
| 8,830,800 B1 | 9/2014 | Pitcher | |
| 8,842,391 B2 | 9/2014 | Zou | |
| 8,934,198 B2 | 1/2015 | Zou | |
| 8,958,271 B1 | 2/2015 | Peng | |
| 8,971,161 B2 | 3/2015 | Cheng | |
| 8,976,634 B2 | 3/2015 | Cheng | |
| 9,047,908 B2* | 6/2015 | Rawat | G11B 13/045 |
| 9,058,824 B2 | 6/2015 | Cheng | |
| 9,129,620 B2 | 9/2015 | Cheng | |
| 9,263,074 B2 | 2/2016 | Huang | |
| 9,281,003 B2* | 3/2016 | Zhao | G11B 5/314 |
| 9,286,931 B2 | 3/2016 | Jayashankar | |
| 2010/0104768 A1 | 4/2010 | Xiao | |
| 2010/0123965 A1 | 5/2010 | Lee | |
| 2010/0157745 A1 | 6/2010 | Okada | |
| 2010/0214685 A1 | 8/2010 | Seigler | |
| 2010/0321814 A1 | 12/2010 | Zou | |
| 2010/0329085 A1 | 12/2010 | Kawamori | |
| 2011/0002199 A1 | 1/2011 | Takayama | |
| 2011/0096431 A1 | 4/2011 | Hellwing | |
| 2011/0205863 A1 | 8/2011 | Zhao | |
| 2011/0209165 A1 | 8/2011 | Tsai | |
| 2012/0105996 A1 | 5/2012 | Katine | |
| 2012/0314549 A1 | 12/2012 | Lee | |
| 2013/0100783 A1 | 4/2013 | Ostrowski | |
| 2013/0107679 A1 | 5/2013 | Huang | |
| 2013/0148485 A1 | 6/2013 | Jin | |
| 2013/0170332 A1 | 7/2013 | Gao | |
| 2013/0235707 A1 | 9/2013 | Zhao | |
| 2013/0279315 A1 | 10/2013 | Zhao | |
| 2013/0288077 A1 | 10/2013 | Dhawam | |
| 2013/0330573 A1 | 12/2013 | Zhao | |
| 2014/0004384 A1 | 1/2014 | Zhao | |
| 2014/0251948 A1 | 9/2014 | Zhao | |
| 2014/0254335 A1 | 9/2014 | Gage | |
| 2014/0254336 A1 | 9/2014 | Jandric | |
| 2014/0307534 A1 | 10/2014 | Zhou | |
| 2014/0313872 A1 | 10/2014 | Rawat | |
| 2014/0374376 A1 | 12/2014 | Jayashankar | |
| 2014/0376342 A1 | 12/2014 | Wessel | |
| 2014/0376349 A1 | 12/2014 | Cheng | |
| 2015/0043319 A1 | 2/2015 | Kasuya | |
| 2015/0063086 A1 | 3/2015 | Wierman | |
| 2015/0117170 A1 | 4/2015 | Zhao | |
| 2015/0131418 A1 | 5/2015 | Huang | |
| 2015/0179194 A1 | 6/2015 | Cheng | |
| 2015/0340052 A1 | 11/2015 | Sankar | |
| 2015/0380020 A1 | 12/2015 | Cheng | |
| 2016/0133291 A1 | 5/2016 | Chen | |
| 2016/0260448 A1 | 9/2016 | Zhao | |
| 2016/0284365 A1 | 9/2016 | Brons | |

FOREIGN PATENT DOCUMENTS

| | | |
|---|---|---|
| JP | 2013-122811 | 6/2013 |
| WO | WO 2013/163195 | 10/2013 |
| WO | WO 2013/163470 | 10/2013 |

OTHER PUBLICATIONS

Hiroaki, Satoh et al., "Evaluation of Adhesion Materials for Gold Line-and-Space Surface Plasmon Antenna on SOI-MOS Photodiode", *Silicon Nanoelectronics Workshop (SNW)*, Jun. 13, 2010, pp. 1-2.

Vogt, K.W. et al., "Characterization of Thin Titanium Oxide Adhesion Layers on Gold: Resistivity, Morphology, and Composition", *Surface Science*, vol. 301, No. 1-3, Jan. 10, 1994, pp. 203-213.

Notification Concerning Transmittal of International Preliminary Report on Patentability for PCT/US2013/038280 dated Nov. 6, 2014 (6 pages).

PCT International Search Report and Written Opinion for PCT/US2016/034628 dated Aug. 24, 2016 (14 pages).

PCT International Search Report and Written Opinion for PCT/US2016/034620 dated Aug. 18, 2016 (13 pages).

* cited by examiner

DEVICES INCLUDING NEAR FIELD TRANSDUCER AND ADHESION LAYER

This application is a continuation application of U.S. application Ser. No. 14/396,486, filed Oct. 23, 2014, now U.S. Pat. No. 9,281,003, which is a U.S. National Stage Application of International Application No. PCT/US2013/038280, filed Apr. 25, 2013, which was published in English on Oct. 31, 2013, International Patent Publication No. WO 2013/163470 A1, and which claims priority to U.S. Provisional Application No. 61/637,985 filed on Apr. 25, 2012.

BACKGROUND

Heat assisted magnetic recording (referred to herein as "HAMR") technology is a promising approach for increasing storage density beyond 1 Tbit/inch$^2$. HAMR heads can utilize near field transducers (NFTs) to heat the magnetic recording layers. Poor adhesion between the materials of the NFT and the surrounding structures in the HAMR head can lead to failure during processing or use. Therefore, there remains a need to decrease such failure.

SUMMARY

Disclosed are devices including a near field transducer (NFT); a write pole; at least one dielectric material positioned between the NFT and the write pole; and an adhesion layer positioned between the NFT and the at least one dielectric material.

Also disclosed are devices that include an energy source; a NFT configured to receive energy from the energy source; a write pole; at least one dielectric material positioned between the NFT and the write pole; and an adhesion layer positioned between the NFT and the at least one dielectric material.

Also disclosed are devices that include an energy source; a waveguide configured to receive energy from the energy source and couple it into the NFT; a NFT configured to receive energy from the waveguide; a write pole; at least one dielectric material positioned between the NFT and the write pole; and an adhesion layer positioned between the NFT and the at least one dielectric material.

BRIEF DESCRIPTION OF THE DRAWINGS

FIG. 3B being a side view; and FIG. 3C being a perspective view.

FIG. 4B being a side view; and FIG. 4C being a perspective view.

FIG. 5B being a side view; and FIG. 5C being a perspective view.

FIG. 6B being a side view; and FIG. 6C being a perspective view.

FIG. 7B being a side view; and FIG. 7C being a perspective view.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figures 1, 2:
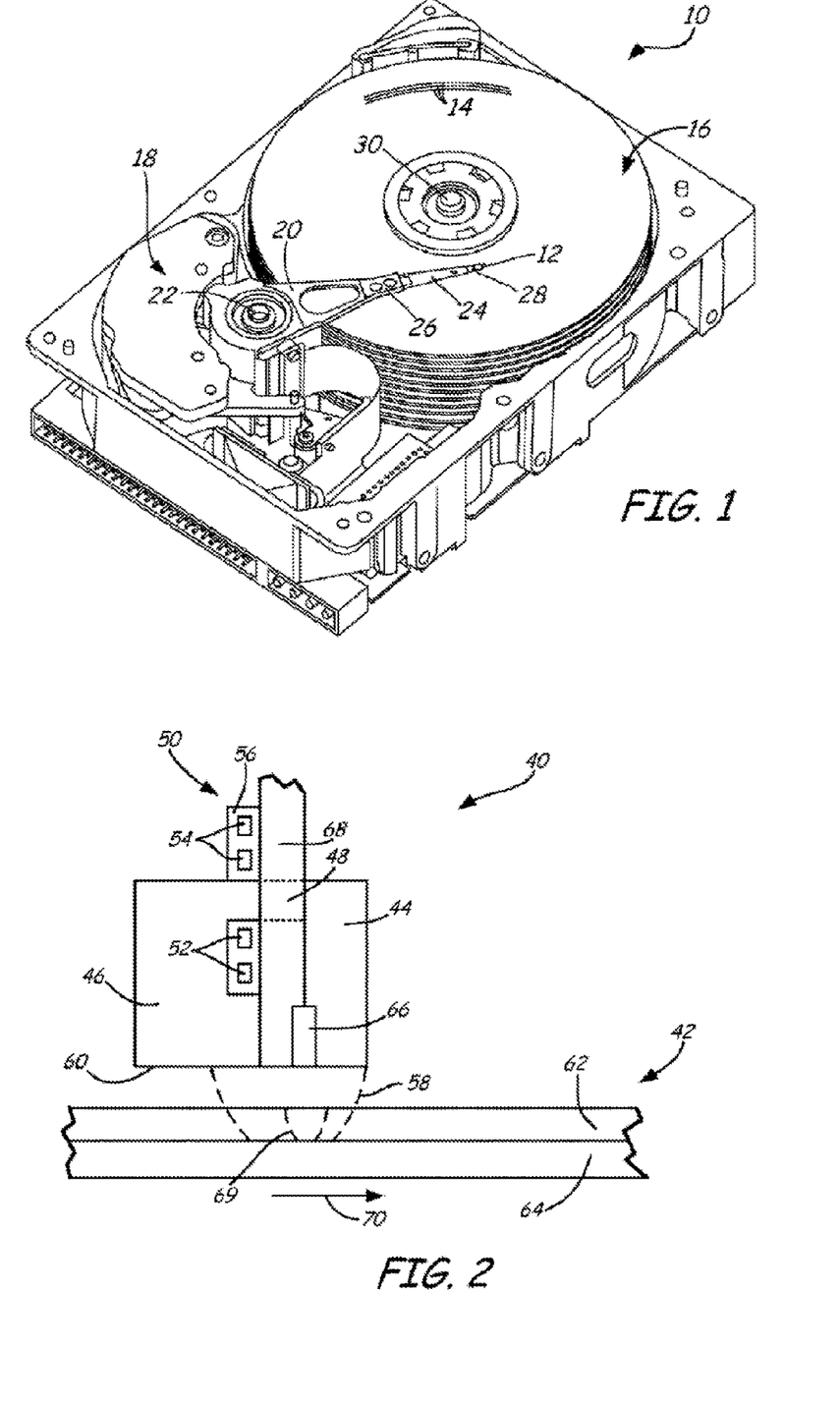
FIG. 1 is a perspective view of a magnetic disc drive that can include HAMR devices.
FIG. 2 is a cross sectional view of a perpendicular HAMR magnetic recording head and of an associated recording medium.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Magnetic devices disclosed herein can also include other structures. Magnetic devices disclosed herein can also be incorporated into larger devices. For example, sliders can include magnetic devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example.

Figure 3A:
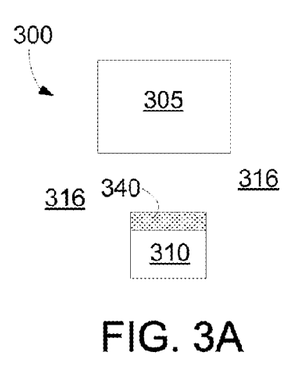
FIGS. 3A, 3B, and 3C are views of at least a portion of a magnetic device including a disclosed top adhesion layer, with FIG. 3A being a view from the ABS.

FIG. 3A depicts a simplified air bearing surface (ABS) view of a portion of a magnetic device. The magnetic device 300 can include a write pole 305 (which may have characteristics as discussed above) and a near field transducer (NFT) 310. The write pole 305 and the NFT 310 are generally surrounded by dielectric material 316. In some embodiments, the layer between the write pole 305 and the NFT 310 can be referred to as the NFT to pole spacing (NPS) layer and the layer between the NFT and the core (not shown in FIG. 3A) can be referred to as the core to NFT spacing (CNS) layer. The dielectric material 316 can also be described as cladding materials or cladding layers. The materials of the NPS layer and the CNS layer need not be the same and can be oxides, for example.

Figure 3B:
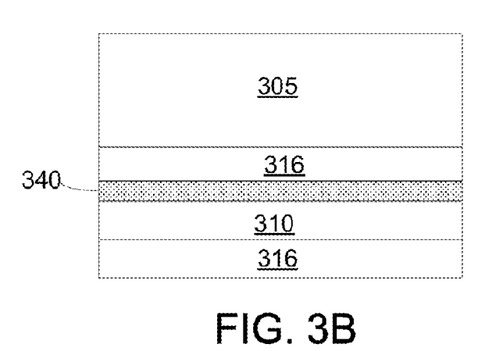

The NFT 310 depicted in FIG. 3 can be described as having a two part structure, but it should be recognized that the described embodiments can be utilized with any type or structure of NFT (for example plasmonic gap type NFTs or peg and disc type NFTs, which can also be referred to as "lollipop" type NFTs). Typically, the NFT 310 can be made of materials, such as for example gold (Au), gold (Au) doped with another material (for example, AuGe), silver (Ag), silver (Ag) doped with another material (for example, AgGe), copper (Cu), and aluminum (Al). In some embodiments, the NFT 310 can also be made of materials listed in U.S. Patent Publication 2011/0205863 entitled "HAMR NFT Materials with Improved Thermal Stability," filed Feb. 23, 2011, the disclosure of which is incorporated herein by reference thereto. Such materials can include gold and at least one Cu, Rh, Ru, Ag, Ta, Cr, Al, Zr, V, Pd, Ir, Co, W, Ti, Mg, Fe, or Mo dopant. The dopant concentration can range from 0.5% to 30%. Such materials can also include gold and a nanoparticle oxide or nitride dopant. The nanoparticle can have a size in a range from 1 to 5 nm. The dopant can include an oxide of at least one of: V, Zr, Mg, Ca, Al, Ti, Si, Ce, Y, Ta, W, or Th. The dopant can also include one of: $V_2O_5$, $ZrO_2$, MgO, CaO, $Al_2O_3$, $TiO_2$, $SiO_2$, $CeO_2$, $Y_2O_3$, $Ta_2O_5$, $WO_2$, or $ThO_2$. The dopant can also include a nitride including at least one of: Ta, Al, Ti, Si, In, Fe, Zr, Cu, W or B Nitride. It should be noted that the NFT pictured in FIGS. 3A and 3B; 4A and 4B; 5A and 5B; 6A and 6B; and 7A and 7B are depicted simplistically and are meant to represent both a lollipop type (also called peg and disc type) NFT structures; and gap type NFT structures.

In some embodiments, the magnetic device 300 can also include a top adhesion layer 340. The top adhesion layer 340 can also be described as a seed layer. As such, the top adhesion layer 340 may advantageously enhance the structural integrity of the NFT 310 to dielectric 316 interface by increasing the adherence of one material to another. The material of the top adhesion layer 340 must also be cognizant of the plasmonic nature and requirements of the NFT 310. FIG. 3B shows a side view that includes and displays the same components and shows the top adhesion layer 340 essentially between the NFT 310 and the dielectric material 316.

Figure 3C:
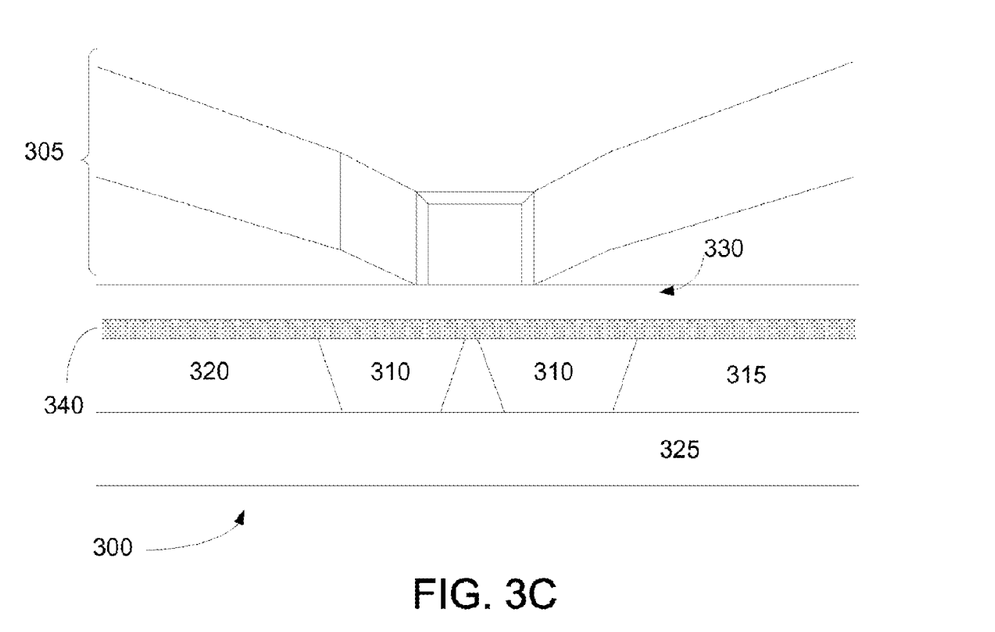

FIG. 3C depicts a partial perspective view of a portion of a magnetic device that more specifically shows more of the components of an exemplary magnetic device 300. This figure delineates the dielectric material 316 that was depicted in FIGS. 3A and 3B. As such, this exemplary magnetic device 300 includes front cladding 315 and 320, bottom cladding 325, and top cladding 330. Generally, in the described embodiment, the NFT 310 is entirely surrounded by cladding materials, which was depicted in the prior figures as dielectric material 316. The at least one cladding layer (and in this embodiment, the front cladding 315 and 320, the bottom cladding 325, and the top cladding 330) can generally be formed from dielectric materials having low (relative to the material of the NFT) index of refractions. Exemplary materials can include $Ta_2O_5$, $Al_2O_3$, $SiO_2$, MgO, MgF2, $Si_3N_4$, SiON, and $TaSiO_x$. Materials disclosed in United States Patent Publication No. 2011/0205864, entitled "Optical Waveguide Clad Material", filed Feb. 23, 2011, the disclosure of which is incorporated herein by reference thereto to the extent it does not conflict, can also be utilized for the front cladding 315 and 320, the bottom cladding 325, the top cladding 330, or some combination thereof. In embodiments, the cladding layers are made of $Al_2O_3$ or $SiO_2$ for example.

It can often be difficult to get the NFT 310 to adhere well to the surrounding cladding layers. If the NFT 310 does not have good adhesion to the materials surrounding it, the magnetic device can fail during processing or during operation of the magnetic device. Disclosed magnetic devices therefore include the top adhesion layer 340. It should be noted that the top adhesion layer 340 can, but need not be a single layer. The phrase "top adhesion layer" can be utilized to refer to more than one structure or layer that is positioned between the NFT and the top cladding layer in this exemplary embodiment. A disclosed top adhesion layer can generally be located between a surface of an NFT and an adjacent surrounding cladding layer.

Figure 4A:
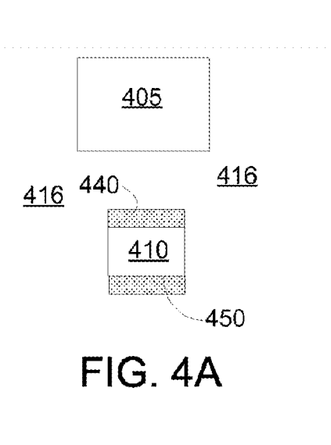
FIGS. 4A, 4B, and 4C are views of at least a portion of a magnetic device including at least a portion of a disclosed top and bottom adhesion layer, with FIG. 4A being a view from the ABS.
Figure 4B:
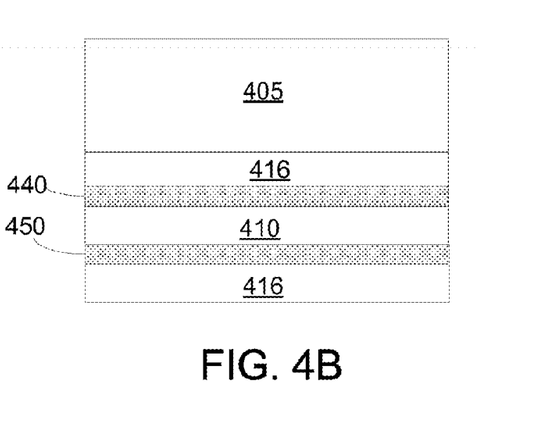
Figure 4C:
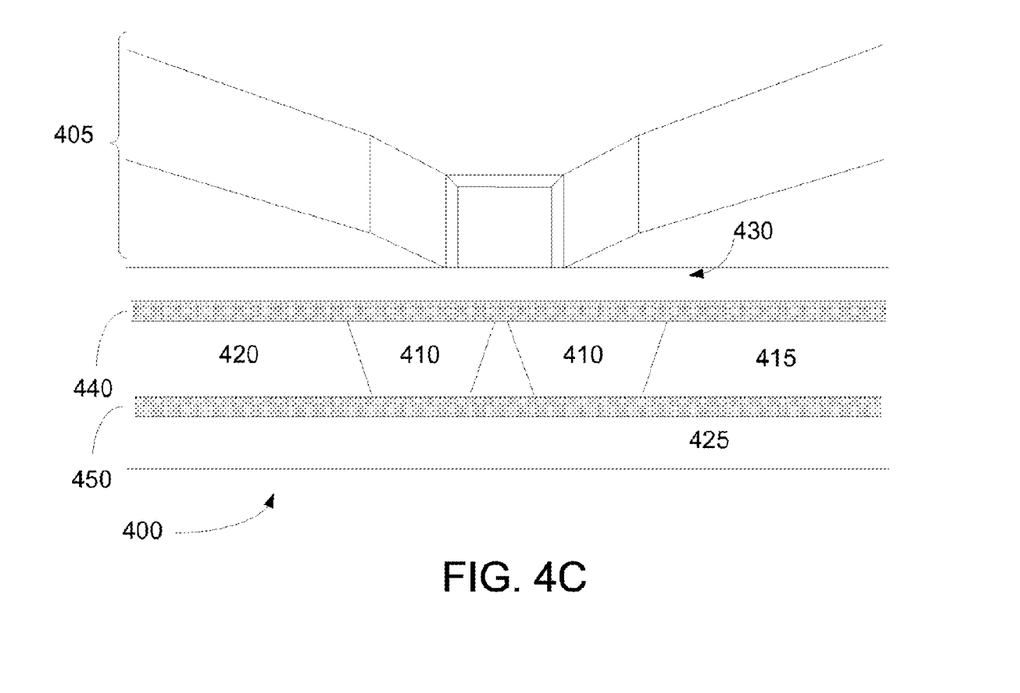

FIGS. 4A, 4B, and 4C depict another exemplary embodiment of a disclosed magnetic device. This magnetic device includes adhesion layers on opposing surfaces of the NFT, i.e., the top and at least part of the bottom. This exemplary magnetic device includes a write pole 405, a NFT 410, dielectric material 416 (which is more specifically shown in FIG. 4C as front cladding 415 and 420, bottom cladding 425 and top cladding 430), a top adhesion layer 440 and a bottom adhesion layer 450. The bottom adhesion layer 450 can be made of the same or similar materials and have the same or similar characteristics (e.g., thickness, discontinuous, etc.) as the top adhesion layer. However, the bottom adhesion layer 450 need not be the same material, and/or have the same characteristics as the top adhesion layer 440.

Figure 5A:
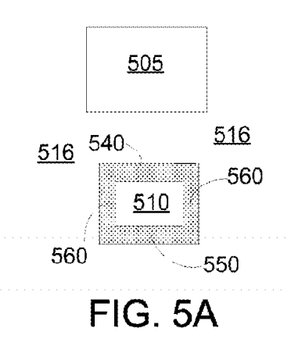
FIGS. 5A, 5B, and 5C are views of at least a portion of a magnetic device including a disclosed top, bottom, and side adhesion layer, with FIG. 5A being a view from the ABS.
Figure 5B:
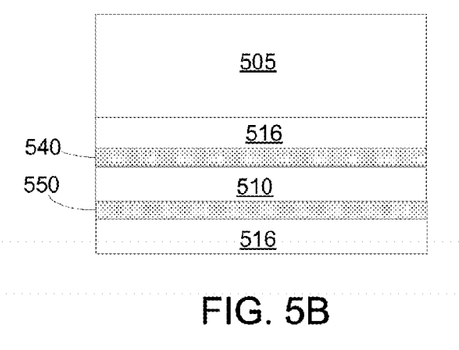
Figure 5C:
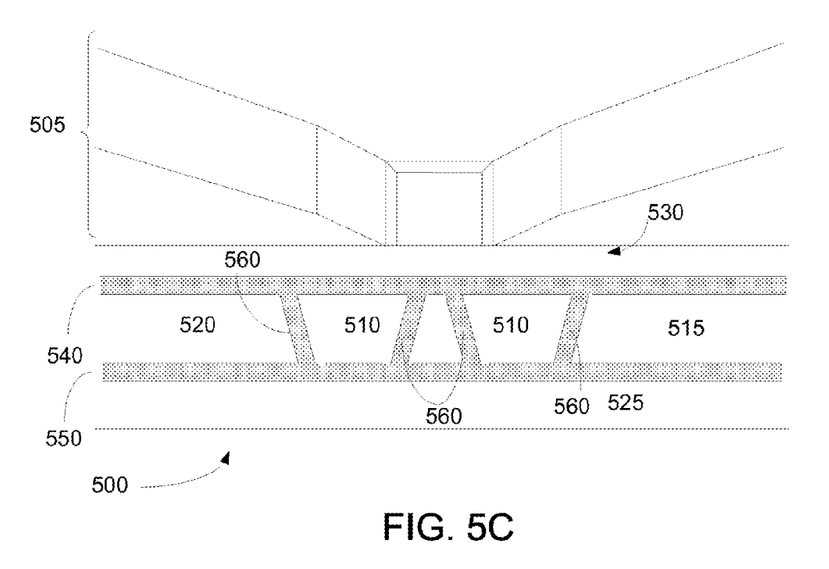

FIGS. 5A, 5B, and 5C depict another exemplary embodiment of a disclosed magnetic device. This magnetic device includes adhesion layers on or around all surfaces of the NFT, i.e., the top, and the bottom and sides. It should be noted herein that the bottom surfaces of the NFT in some embodiments can include the sides, designated by side adhesion layers 560. The sides can be considered as part of the bottom because the NFT material may be deposited within a trench, which in these embodiments is first lined with the adhesion layer material. This exemplary magnetic device includes a write pole 505, a NFT 510, dielectric material 516 (which is more specifically shown in FIG. 5C as front cladding 515 and 520, bottom cladding 525 and top cladding 530), a top adhesion layer 540, a bottom adhesion layer 550 and side adhesion layer 560. The bottom adhesion layer 550 can be made of the same or similar materials and have the same or similar characteristics (e.g., thickness, discontinuous, etc.) as the top adhesion layer 540, and/or the side adhesion layer 560. However, the bottom adhesion layer 550 need not be the same material, and/or have the same characteristics as the top adhesion layer 540 and/or the side adhesion layer 560. It should be noted that the top adhesion layer 540, the bottom adhesion layer 550 and the side adhesion layer 560 are all depicted as a single material, however, this need not be the case and in fact the various elements need not contact each other at all.

Figure 6A:
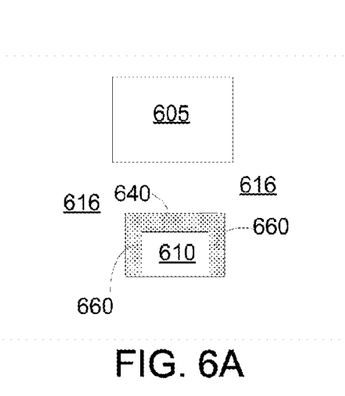
FIGS. 6A, 6B, and 6C are views of at least a portion of a magnetic device including a disclosed top and side adhesion layer, with FIG. 6A being a view from the ABS.
Figure 6B:
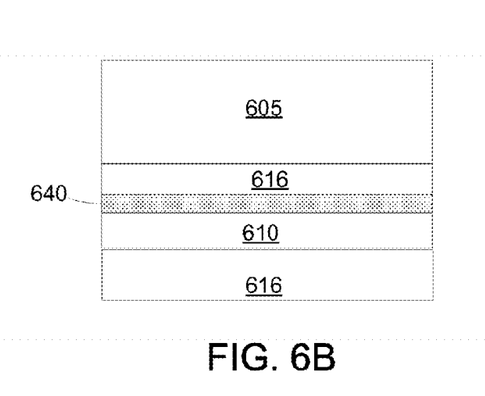
Figure 6C:
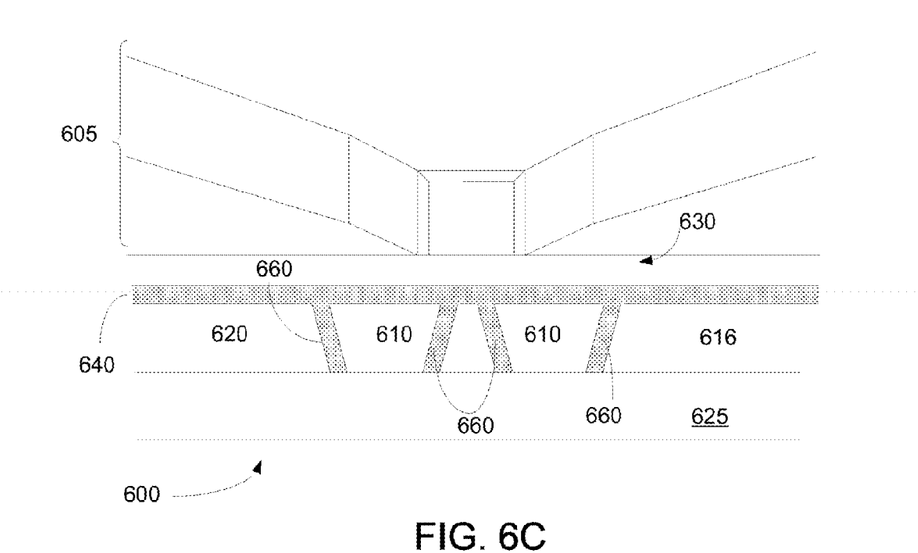

FIGS. 6A, 6B, and 6C depict another exemplary embodiment of a disclosed magnetic device. This magnetic device includes adhesion layers on or around the top, and the sides of the NFT. It should be noted herein that the sides can be considered as part of the bottom because the NFT material may be deposited within a trench, which in these embodiments is first lined with the adhesion layer material. In such an embodiment, only the sides of the gaps (in the case of a gap type NFT for example) would have adhesion layer material deposited thereon. This exemplary magnetic device includes a write pole 605, a NFT 610, dielectric material 616 (which is more specifically shown in FIG. 6C as front cladding 615 and 620, bottom cladding 625 and top cladding 630), a top adhesion layer 640 and side adhesion layer 660. The top adhesion layer 640 can be made of the same or similar materials and have the same or similar characteristics (e.g., thickness, discontinuous, etc.) as the side adhesion layer 660. However, top adhesion layer 640 need not be the same material, and/or have the same characteristics as the side adhesion layer 660. It should be noted that the top adhesion layer 640 and the side adhesion layer 660 are all depicted as a single material, however, this need not be the case and in fact the various elements need not contact each other at all.

Figure 7A:
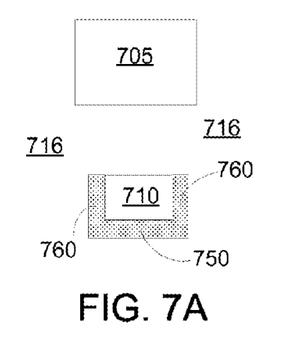
FIGS. 7A, 7B, and 7C are views of at least a portion of a magnetic device including a disclosed bottom and side adhesion layer, with FIG. 7A being a view from the ABS.
Figure 7B:
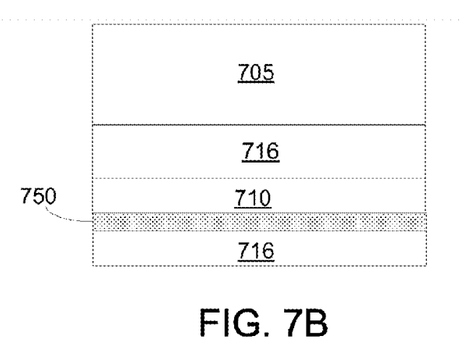
Figure 7C:
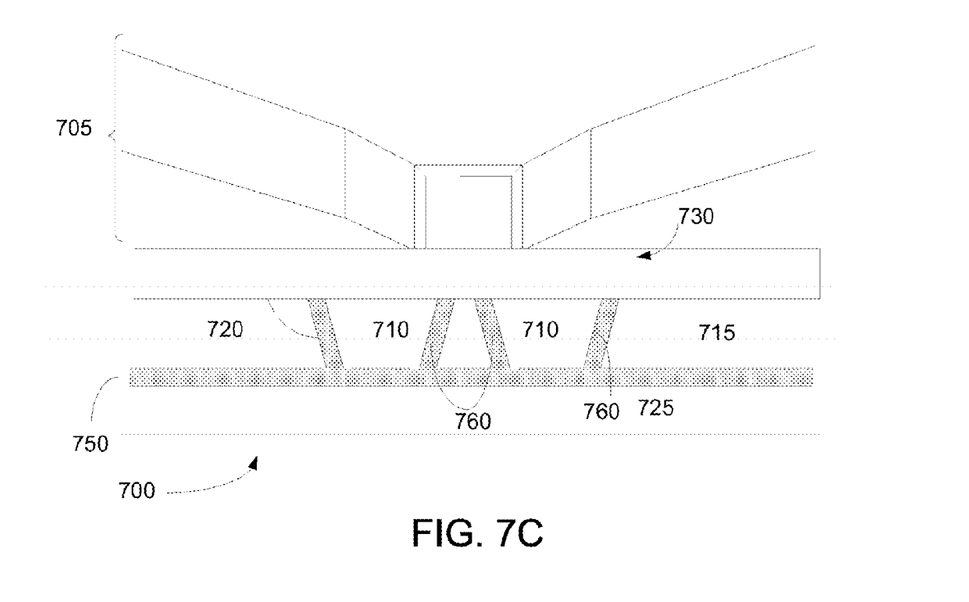

FIGS. 7A, 7B, and 7C depict another exemplary embodiment of a disclosed magnetic device. This magnetic device includes adhesion layers on or around the bottom, and the sides of the NFT. It should be noted herein that the sides can be considered as part of the bottom because the NFT material may be deposited within a trench, which in these embodiments is first lined with the adhesion layer material. In such an embodiment, both the sides of the gaps and the bottom of the gaps (in the case of a gap type NFT for example) would have adhesion layer material deposited thereon. This exemplary magnetic device includes a write pole 705, a NFT 710, dielectric material 716 (which is more specifically shown in FIG. 7C as front cladding 715 and 720, bottom cladding 725 and top cladding 730), a bottom adhesion layer 750 and side adhesion layer 760. The bottom adhesion layer 750 can be made of the same or similar materials and have the same or similar characteristics (e.g., thickness, discontinuous, etc.) as the side adhesion layer 760. However, bottom adhesion layer 750 need not be the same material, and/or have the same characteristics as the side adhesion layer 760. It should be noted that the bottom adhesion layer 750 and the side adhesion layer 760 are all depicted as a single material, however, this need not be the case and in fact the various elements need not contact each other at all.

Any of the adhesion layers (top, bottom, side, or combinations thereof) can independently have thicknesses from 2.5 Å to 50 Å; from 5 Å to 30 Å; or from 5 Å to 20 Å. Any of the adhesion layers (top, bottom, side, or combinations thereof) can also independently be described as being discontinuous or continuous. Disclosed discontinuous adhesion layers, can be described as being composed of numerous "islands" of metal material. The islands can, but need not have disparate sizes and shapes. The islands can, but need not, be entirely irregular in nature. Disclosed discontinuous adhesion layers, can be described as less than a monolayer thick, or have an average thickness that is less than a monolayer thick. It is to be understood that the material of disclosed discontinuous adhesion layers, may not be present across the entire surface of the structure it is "on top of". Disclosed continuous adhesion layers can include material that does spread across the entire region of the layer. Disclosed continuous adhesion layers can be described as at least or more than a monolayer thick, or have an average thickness that is at least a monolayer thick. Both disclosed discontinuous adhesion layers and continuous adhesion layers, can be described by an average thickness.

The average thickness of an adhesion layer can be measured by transmission electron microscopy (TEM), or X-ray reflectivity (XRR), or x-ray photoelectron spectroscopy (XPS) for example. The thickness can be determined using calibration from standard samples having known thicknesses.

Disclosed adhesion layers can generally be formed from materials that could provide enhanced chemical bonding with the layers next to it, for example the cladding layer and the NFT material; have no or limited interface reactions; have acceptable levels of NFT coupling efficiency loss; or some combination thereof.

In some embodiments, materials that could provide enhanced chemical bonding with the cladding layer may be described as materials with at least a partially filled conduction band, or in some embodiments, an empty conduction band. An empty conduction band may make it easier for the material to accept additional electrons and form chemical bonds with oxygen (from the cladding material). The materials can also be described as those that are early 3d transition metals having large populations of unfilled states at the Fermi level and that can participate in donor-acceptor type bonding (electrons from the cladding material (for example, an oxide anion (oxygen) atoms) can transfer into the unfilled 3d states of the discontinuous metal layer). Materials that could provide enhanced chemical bonding with the cladding layer can also be described as materials that have larger negative heat of formation of their oxides. Such materials would have a better chance to bond well with oxide substrates because such a bond would be thermodynamically favored. Such materials can include for example zirconium (Zr), titanium (Ti), yttrium (Y), scandium (Sc), aluminum (Al), ruthenium (Ru), vanadium (V), silicon (Si), germanium (Ge), tantalum (Ta), and tin (Sn). In some embodiments, top adhesion layers, side adhesion layers, or both can independently be made of Zr, Ti, Y, Sc, Al, Ru, V, Si, Ge, Ta, Sn, or combinations thereof. In some embodiments, top adhesion layers, side adhesion layers, bottom adhesion layers, or any combination thereof can independently be made of Zr, Ti, Y, Sc, Al, Ru, V, Si, Ge, Ta, Sn, or combinations thereof.

In some embodiments, disclosed adhesion layers can be made of cobalt (Co), nickel (Ni), chromium (Cr), tungsten (W), titanium tungsten (TiW), molybdenum (Mo), magnesium (Mg), niobium (Nb), hafnium (Hf), zinc (Zn), or some combination thereof. In some embodiments, top adhesion layers, side adhesion layers, bottom adhesion layers, or any combination thereof can independently be made of Co, Ni, Cr, W, TiW, Mo, Mg, Nb, Hf, Zn or combination thereof. In some embodiments, the relatively bad optical properties of Co, Ni, Cr, W, TiW, Mo, Mg, Nb, Hf, Zn, or combinations thereof may imply that the thickness of such adhesion layers would be advantageously maintained relatively low, for example not greater than 25 Å; or not greater than 10 Å.

In some embodiments, disclosed adhesion layers can be made of a nitride such as for example, titanium nitride (TiN), zirconium nitride (ZrN), tantalum nitride (TaN), hafnium nitride (HfN) or some combination thereof. In some embodiments, top adhesion layers, side adhesion layers, bottom adhesion layers, or any combination thereof can independently be made of TiN, ZrN, TaN, HfN or combination thereof. In some embodiments, TiN, ZrN, TaN, HfN or combinations thereof may be weakly plasmonic and therefore impart a relatively lower optical penalty, meaning that the thickness of such adhesion layers could be slightly thicker, for example not greater than 50 Å; or not greater than 20 Å.

In some embodiments, disclosed adhesion layers can be made of a oxides, for example transparent oxides such as for example, indium oxide ($In_2O_3$), tin oxide ($SnO_2$), a solid solution of $In_2O_3$—$SnO_2$ (ITO), zinc oxide (ZnO), aluminum (Al) doped ZnO, gallium (Ga) doped ZnO, or some combination thereof. In some embodiments, top adhesion layers, side adhesion layers, bottom adhesion layers, or any combination thereof can independently be made of $In_2O_3$, $SnO_2$, ITO, ZnO, Al doped ZnO, Ga doped ZnO, or combinations thereof. In some embodiments, $In_2O_3$, $SnO_2$, ITO, ZnO, Al doped ZnO, Ga doped ZnO, or combinations thereof may be weakly plasmonic and therefore impart a relatively lower optical penalty, meaning that the thickness of such adhesion layers could be slightly thicker, for example not greater than 50 Å; or not greater than 20 Å.

In some embodiments, disclosed adhesion layers can be made of sulfides, such as for example, sulfides of Zr, Zn, Ti, Co, silver (Ag), copper (Cu), indium (In), cadmium (Cd), Sn, bismuth (Bi), lead (Pb), selenium (Se), iron (Fe), Mo; or binary sulfides thereof. In some embodiments, top adhesion layers, side adhesion layers, bottom adhesion layers, or any combination thereof can independently be made of sulfides of Zr, Zn, Ti, Co, Ag, Cu, In, Cd, Sn, Bi, Pb, Se, Fe, or Mo; or binary sulfides thereof.

In some embodiments, disclosed adhesion layers could also be made of silicon carbide (SiC), hydrogenated silicon carbide (SiC:H), or combinations thereof, for example.

Materials that have no or limited interface reactions include materials that generally don't or have minimal diffusion into the NFT and/or cladding materials. Such materials also generally don't have intermetallic formation. The material desirably would maintain such properties up to temperatures of about 400° C. This could allow (or ensure) minimal degradation of the optical properties of the NFT material and good thermal stability.

Materials that provide acceptable levels of NFT coupling efficiency loss are also desired. Such materials can generally have relatively high indices of refraction. The presence of a non-plasmonic material layer, e.g., a disclosed adhesion layer in some embodiments, at the interface of the NFT material and the cladding material layer can "dampen" the ability of that interface to support surface plasmons, which can result in weaker electric field emission from the NFT.

Also disclosed herein are devices that include a near field transducer and a write pole, such as 310 and 305 in FIG. 3A. Such an exemplary device can also include a NFT to pole spacer or spacing (NPS) layer, a core to NFT spacer or spacing (CNS) layer, or both that are made of an oxide, for example $SiO_2$ that is doped with a dopant. Exemplary dopants can include, for example Ta, Ti, Nb, Hf, or combinations thereof. Such NPS, CNS, or both layers would provide good adhesion to the NFT material but would still provide acceptable or even good optical properties. A desired refractive index, for example n<1.6 could be utilized to control the level of doping in the material.

Methods of making devices including disclosed adhesion layers vary depending on the location of the adhesion layer (i.e., bottom, side, top). In embodiments where a bottom adhesion layer and/or a side adhesion layer are being utilized, the bottom and/or the side adhesion layer are deposited, then the NFT material is deposited, then the cladding or dielectric material. The bottom and/or side adhesion layers then affects adhesion between the underlying dielectric material (for example the bottom cladding layer and the front cladding layer, see FIG. 3, bottom cladding layer 325 and front cladding layer 315 and 320). In embodiments where a top adhesion layer is utilized, the top adhesion layer material is deposited on the NFT material after it is deposited, for example in a trench (either lined with a disclosed adhesion layer material or not). The top adhesion layer then affects adhesion between the NFT material and the overlying dielectric material (for example the top cladding layer, see FIG. 3, top cladding layer 330 for example).

An exemplary method of forming disclosed adhesion layers can include magnetron sputtering using an ultraslow deposition rate. In some embodiments, the process is set to target a thickness less than that of a metal monolayer, and a discontinuous layer is formed.

One exemplary method of forming disclosed adhesion layers is in-situ deposition, where the adhesion layer and the NFT layer, or the adhesion layer and the top oxide layer, are deposited without breaking vacuum. Such a method can discourage oxidation of the adhesion layer, which could compromise its adherent properties.

Another exemplary method of forming disclosed adhesion layers can include low-energy processes such as chemical vapor deposition (CVD) or atomic layer deposition (ALD). When using such techniques, the absence of adatom mobility and high metal surface free energy relative to the material of the cladding layer can cause a somewhat (or in embodiments very) regular distribution of small diameter islands to be grown. This promotes topographical interlocking at the NFT/cladding layer interface. An island like film structure can also be formed using "activated dewetting" of the material, in which an ambient metal deposition is followed by a rapid thermal anneal to promote segregation of the film into islands.

Another exemplary method of forming disclosed adhesion layers would include deposition of a protection layer of an oxide layer that is different from the desired oxide as NPS after the adhesion layer(s) were formed. This would allow vacuum to be broken before deposition of the dielectric layer thereon.

Adhesion layers are thought to provide enhanced chemical bonding, nanoscale topography, limited interface reactions (diffusion, intermetallic formation), or some combination thereof in order to improve adhesion between the NFT and the at least one cladding layer. Because of the discontinuous nature of some embodiments of the adhesion layer, and/or the small thickness of a continuous layer in other embodiments of the adhesion layer, the material of the adhesion layer occupies only a small fraction of the active plasmonic interface of the NFT. This allows adhesion to be enhanced without detrimentally affecting the optical properties of the NFT.

Processes to form the adhesion layer could be easily integrated into the overall manufacturing process of the magnetic device. Overall, the use of disclosed adhesion layers would decrease or eliminate yield loss due to delamination of the NFT and contribute to increased NFT lifetime during the operation of the magnetic device with very little effect on current formation processes for the magnetic device.

EXAMPLES

While the present disclosure is not so limited, an appreciation of various aspects of the disclosure will be gained through a discussion of the examples provided below.

Adhesion in Ex-Situ Processes

Figure 8:
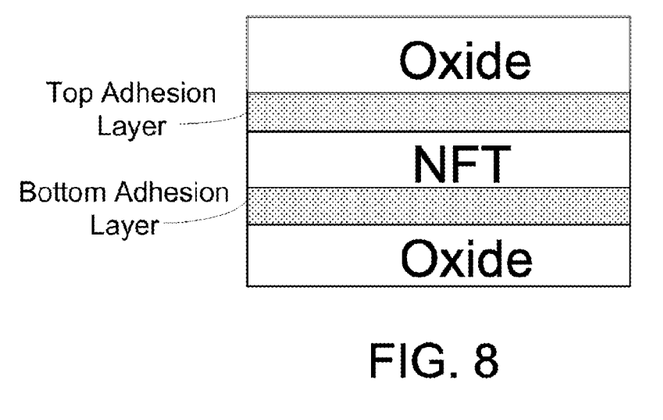
FIG. 8 shows a side view of an exemplary stack utilized to carry out the disclosed examples.

A layered structure shown in FIG. 8 was fabricated. The bottom oxide layer represents the CNS layer, i.e., the core to NFT space layer in disclosed devices and was 50 nm TaSiOx. A bottom adhesion layer is represented by the first Zr layer. The 25 nm gold layer represents the NFT layer in disclosed devices. In some of the examples, a top adhesion layer is the second Zr layer. The Zr layer was formed ex-situ. The top oxide layer represents the NFT to pole space (NPS) layer in disclosed devices and itself included a three layer structure made up of a physical vapor deposited (PVD) $SiO_2$ layer; a 5 nm flash of PVD $SiO_2$ and 25 nm tetra-ethyl-orthosilicate (TEOS) $SiO_2$; and 30 nm $TaSiO_x$.

A sheet film tape test was performed on the structures to determine whether the structure delaminated or not. A sheet film test is done by depositing the film on a wafer, then applying tape (sticky side down) onto the film and pulling it off. Strongly adhering films will stay bonded to the substrate and the tape will pull off with no delamination. Poorly adhering films will pull the film off with the tape.

Table 1 shows various stacks that were tested and the results obtained. All stacks tested in Table 1 included a bottom adhesion layer of 5 Å Zr. All stacks were rapid thermal annealed (RTA) at 350° C. for 15 minutes. All stacks visually looked good before the tape test was performed.

TABLE 1

| No. | Zr Top Adhesion Layer Thickness (Å) | NPS Type | Tape Test |
|---|---|---|---|
| 1 | 0 | TEOS - $SiO_2$ | $SiO_2$ film was easily pulled off with tape |
| 2 | 5 | TEOS - $SiO_2$ | $SiO_2$ can be pulled off with tape on some locations - minor delamination |
| 3 | 10 | TEOS - $SiO_2$ | No delamination - passed tape test |
| 4 | 20 | TEOS $SiO_2$ | No delamination - passed tape test |
| 5 | 30 | TEOS - $SiO_2$ | No delamination - passed tape test |
| 6 | 40 | TEOS - $SiO_2$ | No delamination - passed tape test |
| 7 | 50 | TEOS - $SiO_2$ | No delamination - passed tape test |
| 8 | 0 | PVD-$SiO_2$ | $SiO_2$ can be pulled off with tape on some locations - minor delamination |
| 9 | 5 | PVD-$SiO_2$ | No delamination - passed tape test |
| 10 | 0 | TaSiOx | No delamination - passed tape test |
| 11 | 5 | TASiOx | No delamination - passed tape test |

Adhesion in In-Situ Processes

The stacks in Table 2 were prepared on a Si/$SiO_2$/$TaSiO_x$ 50 nm/Zr 5 Å/Au 25 nm stack using in-situ processes for depositing the top adhesion layer. This implies that the vacuum was not broken between the deposition of the 25 nm gold layer and the top Zr layer (representing the top adhesion layer). Each stack had a second duplicate ran, which is presented directly below the first. The stacks were annealed at the different conditions given in Table 2. For the sake of clarity, the first four entries (eight considering duplicates) in Table 2 did not include a top adhesion layer and the last eight four entries (eight considering duplicates) included a top adhesion layer.

TABLE 2

| | | | Results of Tape Test | | |
|---|---|---|---|---|---|
| No. | Additional Layers | As deposited | RTA at 225° C. for 15 min. | 225° C. for 3 hrs vacuum anneal | 300° C. air anneal for 15 min. |
| 12 | 30 nm PVD $SiO_2$ | 90-100% delam | x | x | x |
| 13 | Duplicate | 90-100% delam | x | x | x |
| 14 | 5 nm FC/25 nm LTC | 100% delam | x | x | x |
| 15 | Duplicate | 100% delam | x | x | x |
| 16 | 10 nm FC/ 25 nm LTC | 100% delam | x | x | x |
| 17 | Duplicate | 100% delam | x | x | x |
| 18 | 30 nm TaSiOx | 0% delam | 0% delam | 0% delam | 0% delam |

TABLE 2-continued

| | | Results of Tape Test | | | |
|---|---|---|---|---|---|
| No. | Additional Layers | As deposited | RTA at 225° C. for 15 min. | 225° C. for 3 hrs vacuum anneal | 300° C. air anneal for 15 min. |
| 19 | Duplicate | One location shows delam, but other locations 0% | | | |
| 20 | Zr 5 Å/30 nm PVD SiO$_2$ | One location shows delam, but other locations 0% | One location shows delam, but other locations 0% | Other locations 0% | Started to show more delam - 10-20% |
| 21 | Duplicate | One location shows delam, but other locations 0% | | | |
| 22 | 5 Å Zr/5 nm FC/25 nm LTC | 5-10% delam near wafer edge, but other locations 0% | 5-10% delam near wafer edge, but other locations 0% | Started to show more delam - 50-60% | 90-100% delam |
| 23 | Duplicate | 0% delam | | | |
| 24 | 5 Å Zr/10 nm FC/20 nm LTC | 5-10% delam near wafer edge, but other locations 0% | 5-10% delam near wafer edge, but other locations 0% | Started to show more delam - 50-60% | 90-100% delam |
| 25 | Duplicate | 0% delam | | | |
| 26 | 5 Å Zr/30 nm TaSiOx | 0% delam | One location shows delam, but other locations 0% | X (wafer broke) | X |
| 27 | Duplicate | 0% delam | 0% delam | 0% delam | 0% delam |

FC = Flash PVD SiO$_2$
LTC = LDR tetra-ethyl-ortho-silicate SiO$_2$

Optical Properties

The optical properties of examples 12, 14, 18, 20, 22, and 26 from Table 2 were evaluated by measuring the index of refraction (n) and the extinction coefficient (κ) by ellipsometry as deposited and after annealing at various conditions. The data is shown in Table 3 below.

TABLE 3

| | As deposited | | RTA at 225° C. 15 mins | | RTA at 300° C. for 15 mins. | |
|---|---|---|---|---|---|---|
| | n | k | n | k | n | k |
| 12 | 0.23 | 5.51 | 0.178 | 5.5 | 0.173 | 5.5 |
| 14 | 0.23 | 5.5 | 0.175 | 5.5 | 0.171 | 5.5 |
| 18 | 0.27 | 5.54 | 0.231 | 5.54 | 0.22 | 5.52 |
| 20 | 0.33 | 5.56 | 0.31 | 5.57 | 0.294 | 5.51 |
| 22 | 0.35 | 5.58 | 0.28 | 5.53 | 0.267 | 5.52 |
| 26 | 0.26 | 5.52 | 0.23 | 5.54 | 0.213 | 5.5 |

Thus, embodiments of INTERLAYER FOR DEVICE INCLUDING NFT AND CLADDING LAYERS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
    a near field transducer (NFT), the NFT comprising gold and at least one of Cu, Rh, Ru, Ag, Ta, Cr, Al, Zr, V, Pd, Ir, Co, W, Ti, Mg, Fe, or Mo dopant; an oxide of at least one of: V, Zr, Mg, Ca, Al, Ti, Si, Ce, Y, Ta, W, or Th; or a nitride of at least one of: Ta, Al, Ti, Si, In, Fe, Zr, Cu, W or B;
    a write pole;
    at least one dielectric material positioned between the NFT and the write pole; and
    an adhesion layer positioned between the NFT and the at least one dielectric material.

2. The device according to claim 1, wherein the adhesion layer comprises one or more materials selected from:
    zirconium (Zr), titanium (Ti), yttrium (Y), scandium (Sc), aluminum (Al), ruthenium (Ru), vanadium (V), silicon (Si), germanium (Ge), tantalum (Ta), tin (Sn), and combinations thereof;
    cobalt (Co), nickel (Ni), chromium (Cr), tungsten (W), titanium tungsten (TiW), molybdenum (Mo), magnesium (Mg), niobium (Nb), hafnium (Hf), zinc (Zn), and combinations thereof;
    titanium nitride (TiN), zirconium nitride (ZrN), tantalum nitride (TaN), hafnium nitride (HfN) and combinations thereof;
    indium oxide (In$_2$O$_3$), tin oxide (SnO$_2$), a solid solution of In$_2$O$_3$—SnO$_2$ (ITO), zinc oxide (ZnO), aluminum (Al) doped ZnO, gallium (Ga) doped ZnO, and combinations thereof;
    sulfides of Zr, Zn, Ti, Co, silver (Ag), copper (Cu), indium (In), cadmium (Cd), Sn, bismuth (Bi), lead (Pb), selenium (Se), iron (Fe), Mo; or binary sulfides thereof; and
    silicon carbide (SiC) or hydrogenated silicon carbide (SiC:H).

3. The device according to claim 1, wherein the adhesion layer comprises Zr, Ti, Y, Sc, Al, Ru, V, Si, Ge, Ta, Sn, or combinations thereof and the adhesion layer has an average thickness from about 2.5 Å to about 50 Å.

4. The device according to claim 1, wherein the adhesion layer comprises Co, Ni, Cr, W, TiW, Mo, Mg, Nb, Hf, Zn, or combinations thereof; and the adhesion layer has an average thickness of not greater than about 25 Å.

5. The device according to claim 1, wherein the adhesion layer comprises TiN, ZrN, TaN, HfN, or combinations thereof and the adhesion layer has an average thickness of not greater than about 50 Å.

6. The device according to claim 1, wherein the adhesion layer comprises In$_2$O$_3$, SnO$_2$, ITO, ZnO, Al doped ZnO, Ga doped ZnO, or combinations thereof; and the adhesion layer has an average thickness of not greater than about 50 Å.

7. The device according to claim 1, wherein the adhesion layer comprises sulfides of Zr, Zn, Ti, Co, Ag, Cu, In, Cd, Sn, Bi, Pb, Se, Fe, Mo; or binary sulfides thereof.

8. The device according to claim 1, wherein the adhesion layer comprises SiC, SiC:H, or combinations thereof.

9. The device according to claim 1 further comprising a second adhesion layer adjacent the opposing surface of the NFT.

10. The device according to claim 9, wherein the second adhesion layer comprises one or more materials selected from:
- Co, Ni, Cr, W, TiW, Mo, Mg, Nb, Hf, Zn, and combinations thereof;
- TiN, ZrN, TaN, HfN, and combinations thereof;
- In$_2$O$_3$, SnO$_2$, ITO, ZnO, Al doped ZnO, Ga doped ZnO and combinations thereof;
- sulfides of Zr, Zn, Ti, Co, Ag, Cu, In, Cd, Sn, Bi, Pb, Se, Fe, Mo; or binary sulfides thereof; and
- SiC, SiC:H, and combinations thereof.

11. The device according to claim 1 further comprising additional adhesion layers adjacent a non-opposing surface of the NFT.

12. The device according to claim 11, wherein the additional adhesion layer comprises one or more materials selected from:
- Co, Ni, Cr, W, TiW, Mo, Mg, Nb, Hf, Zn, and combinations thereof;
- TiN, ZrN, TaN, HfN, and combinations thereof;
- In$_2$O$_3$, SnO$_2$, ITO, ZnO, Al doped ZnO, Ga doped ZnO and combinations thereof;
- sulfides of Zr, Zn, Ti, Co, Ag, Cu, In, Cd, Sn, Bi, Pb, Se, Fe, Mo; or binary sulfides thereof; and
- SiC, SiC:H, and combinations thereof.

13. The device according to claim 9 further comprising additional adhesion layers adjacent a non-opposing surface of the NFT.

14. The device according to claim 1, wherein the NFT comprises Au, Au doped with another material, Ag, Ag doped with another material, Cu, or Al.

15. The device according to claim 1, wherein the NFT is a peg and disc type NFT.

16. The device according to claim 1 further comprising an energy source, wherein the NFT is configured to receive energy from the energy source.

17. The device according to claim 16, wherein the energy source comprises a laser.

18. The device according to claim 16 further comprising a waveguide, the waveguide configured to receive the energy from the energy source and couple it into the NFT.

19. The device according to claim 10, wherein the NFT comprises Au, Au doped with another material, Ag, Ag doped with another material, Cu, or Al.

20. The device according to claim 10, further comprising an energy source, wherein the NFT is configured to receive energy from the energy source.

* * * * *